Patented Apr. 6, 1937

2,076,143

UNITED STATES PATENT OFFICE 2,076,143

SULPHUR DYES

Walter Hagge and Karl Haagen, Dessau in Anhalt, Germany, assignors to General Aniline Works, Inc., New York, N. Y., a corporation of Delaware No Drawing. Application January 3, 1936, Serial No. 57,364. In Germany January 12, 1935

9 Claims. (Cl. 260—17)

This invention relates to the manufacture of sulphur dyes by treating decacyclene or its substitution products with a sulphurizing agent and working up the product of reaction in known manner; the dyes are brown and differ from the known sulphur dyes of similar shade by greater clearness and by a reddish tinge not hitherto obtained by means of this class of dye. The dyeings may be obtained with the new dyes and may be after-treated with alkylating agents to produce still brighter tints of enhanced fastness to washing and acids.

The following examples illustrate the invention, the parts being by weight:—

*Example 1.*—100 parts of decacyclene and 400 parts of sulphur chloride are heated together in an oil bath under reflux and whilst stirring to 200° C. (oil bath temperature) in the course of about 3 hours. This temperature is maintained until the mixture, which at first is a dark red solution, has become highly viscous. For completing the formation of the dye the mass is further baked at 270–280° C. for about 8 hours. The cooled mass is ground when cold and dissolved by means of sodium sulphide, the dye being then separated in the usual manner by acidifying and salting out, or precipitating by means of air. It is a red-brown powder freely soluble in aqueous sodium sulphide solution to a deep red solution which dyes cotton full brown-red tints. An aftertreatment of this dyeing with an alkylating or aralkylating agent such as dimethyl-phenyl-benzylammonium-chloride produces a clear shade and shifts the tint towards the yellow end of the spectrum so that a red-orange is obtained. If, instead of the aforesaid ammonium chloride, there is used copper sulphate and potassium chromate for after-treating the dyeing a similar effect is produced. In both cases the fastness of the dyeing is improved, moreover a similar effect may be obtained by conducting the sulphurizing operation in the presence of a metal salt, for instance, a copper-, nickel- or molybdenum salt.

The formation of this dye is not limited to the condition of temperatures named above. It is formed, for instance, already at about 200° C. although the prolongation of the heating is necessary to achieve the maximum yield of dye.

*Example 2.*—15 parts of decacyclene are introduced into 100 parts of molten sulphur and the mass is heated in the oil bath whilst stirring to 300° C. (oil bath temperature) in the course of about 3 hours. This temperature is maintained until it is no longer possible to stir the mass. There follows a baking for about 12 hours at 300° C. whereupon the mass is allowed to cool and ground. It is dissolved with alkali or sodium sulphide and the dye separated by the known method. It resembles the product of Example 1 in respect of solubility and shade of the dyeings which it yields.

Instead of decacyclene there may be used in the foregoing examples hydroxydecacyclenes or decacyclene sulphonic acids respectively, which yield similar dyes when treated with a sulphurizing agent and after-treated, if desired, in the manner described above.

What we claim is:—

1. The process which comprises heating decacyclene with a sulphurizing agent to the reaction temperature.

2. The process which comprises heating decacyclene with a sulphurizing agent to the reaction temperature in the presence of a metal salt of the group consisting of copper-, nickel- and molybdenum salts.

3. The process which comprises heating decacyclene with a sulphurizing agent to the reaction temperature and alkylating the sulphur dye thus obtained.

4. The process which comprises heating decacyclene with sulphur chloride until a highly viscous mass is obtained, baking the mass at a temperature up to about 280° C., dissolving the sulphurized product in sodium sulphide and separating the dye from the solution.

5. The process which comprises heating decacyclene with sulphur chloride until a highly viscous mass is obtained, baking the mass at a temperature up to about 280° C., dissolving the sulphurized product in sodium sulphide, separating the dye from the solution and reacting it with dimethyl-phenyl-benzylammonium chloride.

6. The process which comprises introducing decacyclene into molten sulphur and heating the mixture to about 300° C., dissolving the dye obtained in an alkaline agent of the group consisting of an alkali hydroxide and alkali sulphide and precipitating the dye from this solution.

7. The process which comprises heating decacyclene with a sulphurizing agent to the reaction temperature and aralkylating the sulphur dye obtained.

8. The process which comprises heating decacyclene with a sulphurizing agent to the reaction temperature and alkylating and aralkylating the sulphur dye obtained.

9. Sulphur dyes dyeing cotton full brown-red tints of good fastness and being obtainable according to the process claimed in claim 1.

WALTER HAGGE.
KARL HAAGEN.